US008428610B2

(12) United States Patent
Chowdhury et al.

(10) Patent No.: US 8,428,610 B2
(45) Date of Patent: Apr. 23, 2013

(54) DYNAMIC LOAD BALANCING IN A COMMUNICATION NETWORK

(75) Inventors: Kuntal Chowdhury, Andover, MA (US); Andrew Gibbs, Andover, MA (US); Rajeev Koodli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 12/620,416

(22) Filed: Nov. 17, 2009

(65) Prior Publication Data

US 2010/0124933 A1    May 20, 2010

Related U.S. Application Data

(60) Provisional application No. 61/115,356, filed on Nov. 17, 2008.

(51) Int. Cl.
*H04W 24/00* (2009.01)

(52) U.S. Cl.
USPC ........ 455/453; 455/445; 455/450; 455/452.1; 370/431; 370/329

(58) Field of Classification Search .................. 455/452, 455/450, 451, 452.1, 453, 464, 509, 455, 455/516, 436–444, 67.11, 67.1, 115.1; 370/328, 370/338, 395.41, 431, 329, 331, 341
See application file for complete search history.

(56) References Cited

U.S. PATENT DOCUMENTS

| 7,454,213 | B2* | 11/2008 | Tolli | 455/453 |
| 7,948,940 | B2* | 5/2011 | Jeong et al. | 370/329 |
| 2001/0012778 | A1* | 8/2001 | Eriksson et al. | 455/436 |
| 2003/0108017 | A1* | 6/2003 | Famolari | 370/338 |
| 2005/0021713 | A1 | 1/2005 | Dugan et al. | |
| 2006/0058056 | A1 | 3/2006 | Das et al. | |
| 2006/0193295 | A1 | 8/2006 | White et al. | |
| 2007/0297380 | A1* | 12/2007 | Saito et al. | 370/338 |
| 2009/0270109 | A1* | 10/2009 | Wang Helmersson et al. | 455/453 |

OTHER PUBLICATIONS

Motorola, Technical White Paper, Long Term Evolution, 2007 http://business.motorola.com/experiencelte/pdf/LTETechnicalOverview.pdf.*
Nguyen-Vuong. "Mobility Management in 4G Wireless Heterogeneous Networks", PhD thesis, Universite D'Evray Val-D'Essonne, Jul. 2, 2008 www.biblio.univ.evry.fr/theses/2008/2008EVRY00007.pdf (171 pages).
International Search Report and Written Opinion for International Application No. PCT/US09/64823 mailed Feb. 12, 2010 (4 pages).

(Continued)

*Primary Examiner* — Kamran Afshar
*Assistant Examiner* — Marisol Fahnert
(74) *Attorney, Agent, or Firm* — Wilmer Cutler Pickering Hale and Dorr LLP

(57) ABSTRACT

Methods and systems for providing a dynamic and real time load factor that can be shared with other network elements is disclosed. The load factor can be used in determining the relative load among a set of network elements and in distributing new sessions requests as well as existing session on the set of network elements. The load factor can also be used for determining to which network element a user equipment is handed off. The dynamic load factor can also be shared amongst network elements to determine how the load is balanced among the network elements, such as a mobility management entity (MME).

19 Claims, 11 Drawing Sheets

OTHER PUBLICATIONS

3GPP TS 23.401 v8.3.0 (Sep. 2008), 3rd Generation Partnership Project; Technical Specification Group Services and System Aspects; General Packet Radio Services (GPRS) enhancements for Evolved Universal Terrestrial Radio Access Network (E-UTRAN) access (Release 8), http://www.3gpp.org.

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2-C); Stage 3 (Release 8); http://www.3gpp.org.

3GPP TS 36.413 v8.3.0 (Sep. 2008), 3rd Generation Partnership Project; Technical Specification Group Radio Access Network; Evolved Universal Terrestrial Radio Access Network (E-UTRAN); S1 Application Protocol (S1AP) (Release 8), http://www.3gpp.org.

* cited by examiner

| Octets | Bits | | | | | | | |
|---|---|---|---|---|---|---|---|---|
| | 8 | 7 | 6 | 5 | 4 | 3 | 2 | 1 |
| 1 | Type = 255 (decimal) ||||||||
| 2-3 | Length = n (decimal) ||||||||
| 4-5 | Enterprise ID ||||||||
| 6-(n+3) | Proprietary value ||||||||

FIG. 9

DYNAMIC LOAD BALANCING IN A COMMUNICATION NETWORK

CROSS-REFERENCE TO RELATED APPLICATIONS

This application claims benefit under 35 U.S.C. §119(e) of U.S. Provisional Patent Application No. 61/115,356, entitled "Dynamic Load Balancing in a Communication Network," filed Nov. 17, 2008, which is hereby incorporated by reference herein in its entirety.

FIELD OF THE DISCLOSURE

This disclosure relates to a system and method for providing dynamic load balancing in a communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

The first generation of wireless telephone technology used analog mobile phones in which analog information signals were modulated and transmitted. In second generation (2G) systems, digital information signals were used to modulate a carrier. These 2G technologies used time division multiplex access (TDMA) technology for GSM systems, or code division multiple access (CDMA) technologies for IS-95 systems to distinguish multiple users. Such networks were further upgraded to handle higher-speed packet data using GPRS/EDGE and then HSPA, and CDMA 1X-EVDO in networks referred to as 2.5G and 3G networks. The next evolution is 4G technology, which is referred to as long term evolution-system architecture evolution (LTE-SAE) and uses orthogonal frequency division multiple access (OFDMA) technology. Other wireless protocols have also developed including WiFi (an implementation of various IEEE 802.11 protocols), WiMAX (an implementation of IEEE 802.16), and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

SUMMARY OF THE DISCLOSURE

A dynamic and real time load factor that can be shared with other network elements is disclosed. The load factor can be used in determining the relative load among a set of network elements and in distributing new sessions requests as well as existing session on the set of network elements. The load factor can also be used for determining to which network element a user equipment is handed off. The dynamic load factor can also be shared amongst network elements to determine how the load is balanced among the network elements, such as a mobility management entity (MME).

In some embodiments, a gateway in a communication network implementing a mobility management entity (MME) function is described, where the gateway includes a processing unit configured to run software to monitor load conditions on the MME function in real time and to periodically determine a load capacity value based on the load conditions, wherein the load conditions include information regarding at least one of processing unit usage, memory usage, and number of sessions active, a memory in operative communication with the processing unit where the load capacity value is stored and updated whenever a change occurs in the load capacity value, and the gateway is configured to communicate with one or more eNodeBs and one or more network elements to allow the gateway to send a message that includes a load capacity value informational element to one or more eNodeBs and one or more network elements.

In other embodiments, a method of dynamically representing loading conditions is described that includes monitoring load conditions in real time on a mobility management entity (MME) implemented on a gateway, determining a load capacity value to represent the load conditions of the MME and updating the load capacity value when load conditions when load conditions change for the MME, storing the load capacity value in a memory on the gateway, sending the load capacity value for the MME to an eNodeB, and sending the load capacity value for the MME to a network element.

In yet other embodiments, a gateway is described that implements a mobility management entity (MME) function that is configured to monitor load conditions on the MME function in real time and to periodically determine a load capacity value based on the load conditions, to store and update the load capacity value whenever a change occurs to the load capacity value, and to send a message that includes a load capacity value informational element to one or more eNodeBs and one or more network elements.

BRIEF DESCRIPTION OF THE DRAWINGS

FIG. 9 illustrates a mapping of private extension information element in accordance with certain embodiments;

DETAILED DESCRIPTION

Systems and methods of dynamic load balancing in communication systems are described. In some embodiments, load balancing is accomplished by sharing a value that indicates the amount of resources being expended on a network element in real time. This value is shared with other similar network elements as well as with those network elements that originate the packet traffic or sessions. By sharing a value that indicates the resources available on particular network elements in real time, the load can be balanced across available network elements.

Figure 1:
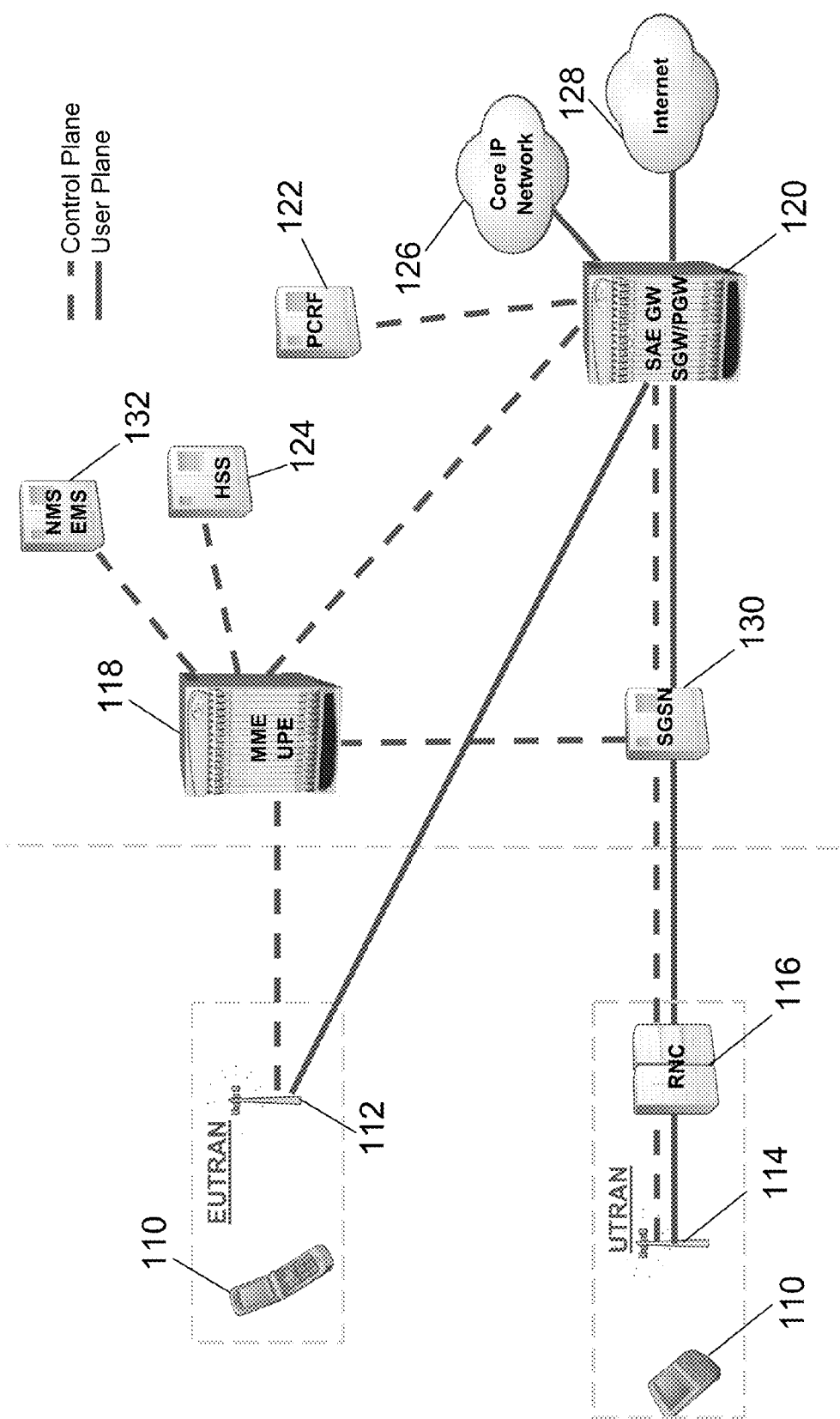
FIG. 1 illustrates a network diagram in accordance with certain embodiments.

FIG. 1 illustrates a network diagram in accordance with certain embodiments. FIG. 1 illustrates a universal mobile telecommunication system (UMTS) release 8 network along with a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, Serving General packet radio service Support Node (SGSN) 130, and network management system (NMS)/element management system (EMS) 132. The MME 118, SGSN 130, and SAE GW 120 can be implemented in a gateway as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as the SAE Core. The EPC includes the MME, SGW, and P-GW components.

MME 118 is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

The NMS/EMS 132 can provide management of the operation, administration, maintenance, and provisioning of networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

Figure 2:
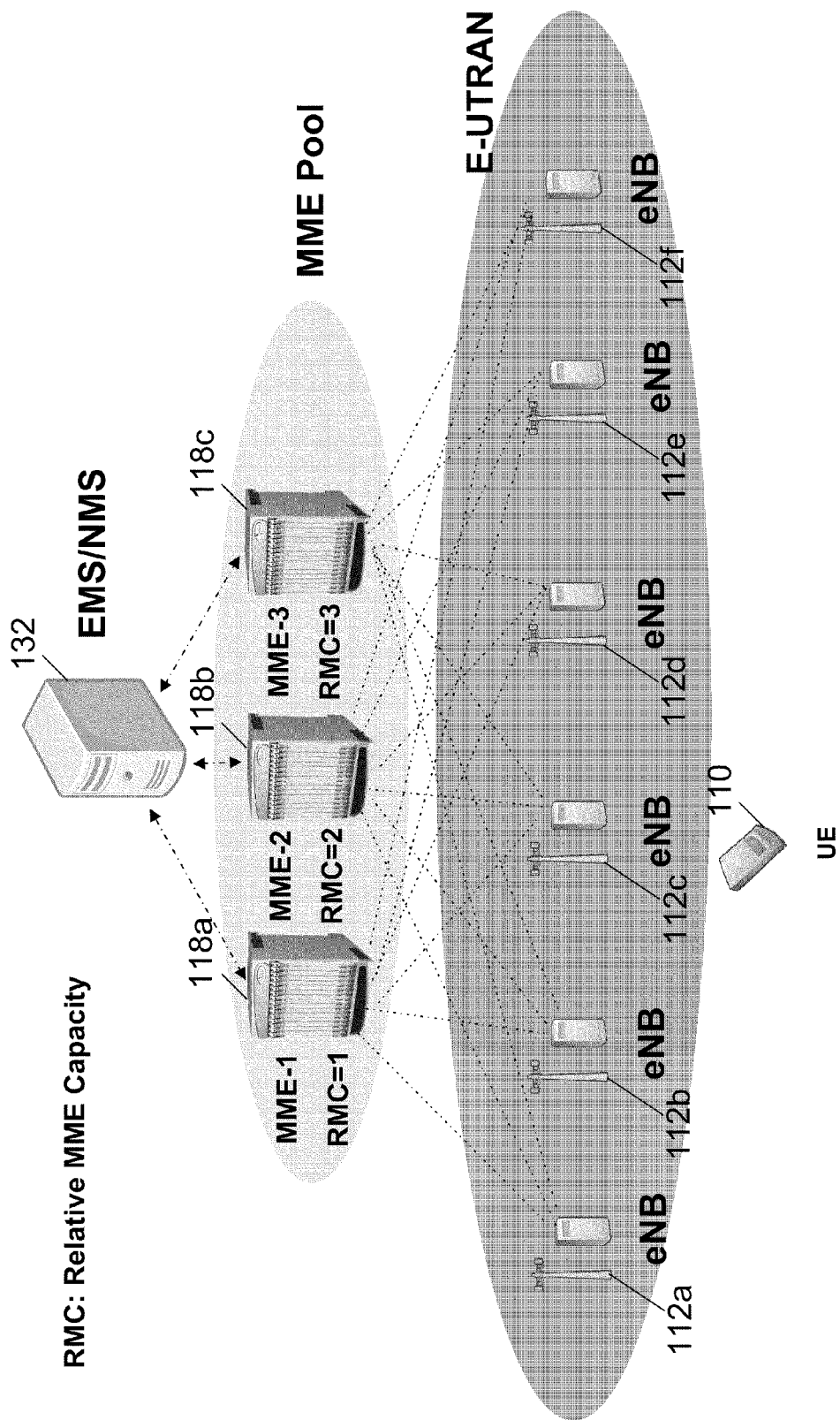
FIG. 2 illustrates a network diagram with load balancing in accordance with certain embodiments.

FIG. 2 illustrates an evolved packet core (EPC) network diagram with load balancing in accordance with certain embodiments. FIG. 2 includes UE 110, eNBs 112a-112f, MMEs 118a-118c, and EMS/NMS 132. In some embodiments, mobility management entity (MME) load balancing is provided dynamically. The eNBs 112a to 112f select MMEs 118a to 118c for incoming calls based on a load capacity value called a relative MME capacity, which can be a static value provisioned in each of the MMEs 118a to 118c in a MME pool. The relative MME capacity is an information element that is sent to the eNBs 112a to 112f by each MME at the time of session setup. The value of the relative MME capacity (RMC) parameter provides a metric to compare MMEs and determine which MME is suited to handle the new session. In some embodiments, the higher the value of this parameter, the more likely the corresponding MME is going to be selected relative to its peers. As shown in FIG. 2, eNBs 112a to 112f are in communication with multiple MMEs 118a to 118c. In operation, if MME 118a has a relative MME capacity (RMC) of 1, while MME 118c has a relative MME capacity of 3, then MME 118c is selected more often for attachment of UEs 110 as new sessions are initiated.

Figure 3:
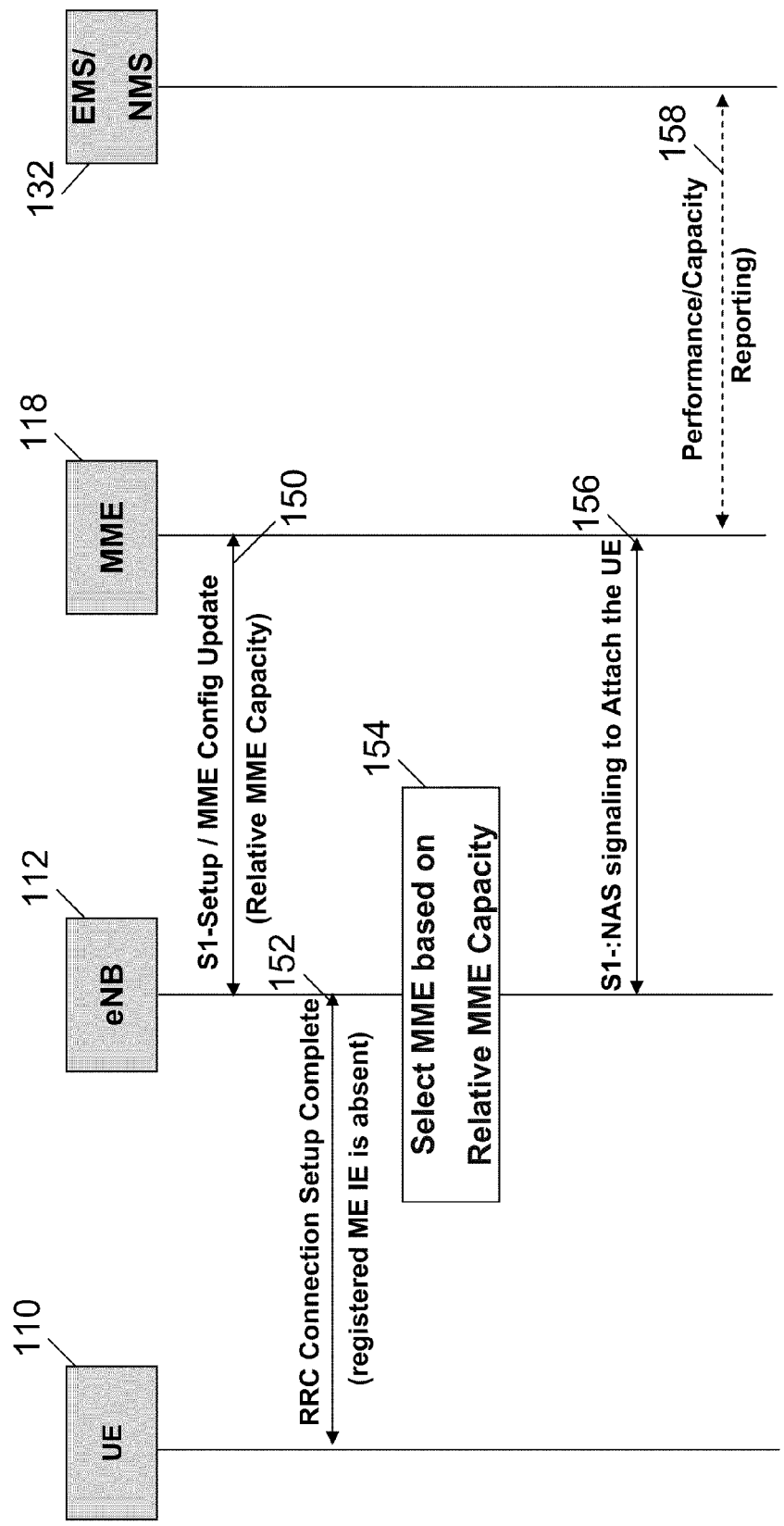
FIG. 3 illustrates a call flow diagram of a network element selection in accordance with certain embodiments.

FIG. 3 illustrates a call flow diagram of a network element selection in accordance with certain embodiments. FIG. 3 includes UE 110, eNBs 112, MMEs 118, and EMS/NMS 132. In 150, MME 118 and eNB 112 exchange S1 setup messages or MME configuration update messages. The S1 setup messages can include eNB 112 sending a S1 setup request to MME 118, and receiving a S1 setup response with relative MME capacity information from MME 118. The S1 setup messaging is used to transfer information to setup a new session or association. The MME config update messaging is used to transfer updated information regarding an existing session or association. With MME config update messaging, MME 118 sends eNB 112 an MME configuration update message with relative MME capacity information, and eNB 112 responds with an MME configuration update acknowledgement message. In 152, radio resource control (RRC) setup messaging is exchanged between UE 110 and eNB 112. In 154, eNB 112 selects an MME based on the relative MME capacity information. In 156, S1 messaging is exchanged between the eNB 112 and the MME 118 to attach the UE 110 to the MME 118 selected by the eNB 112. In 158, optional performance and capacity reporting messaging can be exchanged between MME 118 and EMS/NMS 132.

The relative MME capacity parameter can be dynamically adjusted based on the actual loading on a particular MME. The loading can be a composite of one or more factors such as CPU usage, memory usage, number of sessions active, and rate of incoming data (bytes/second). The MMEs can send updated relative MME capacity based on real time load conditions in any message from the MME to eNBs, in some embodiments. The relative MME capacity can be based upon thresholds or an algorithm. In a threshold embodiment, the load factor is monitored by hardware or software running on a processing unit, which control incrementing and decrementing the relative MME capacity. The relative MME capacity is incremented when a threshold is passed where the load factor is decreasing, and the relative MME capacity is decremented when a threshold is passed where the load factor is increasing. The incrementing and decrementing can include adding a time delay before incrementing to avoid jitter or instability. An algorithm based relative MME capacity determines whether to increment or decrement based on a time weighted load value, where the time weighted load value corresponds to an integer value that is represented in the relative MME capacity. In some embodiments, the trigger to increment or decrement the relative MME capacity can also be manually changed, for example, from a command line interface or other user interface.

Figure 4:
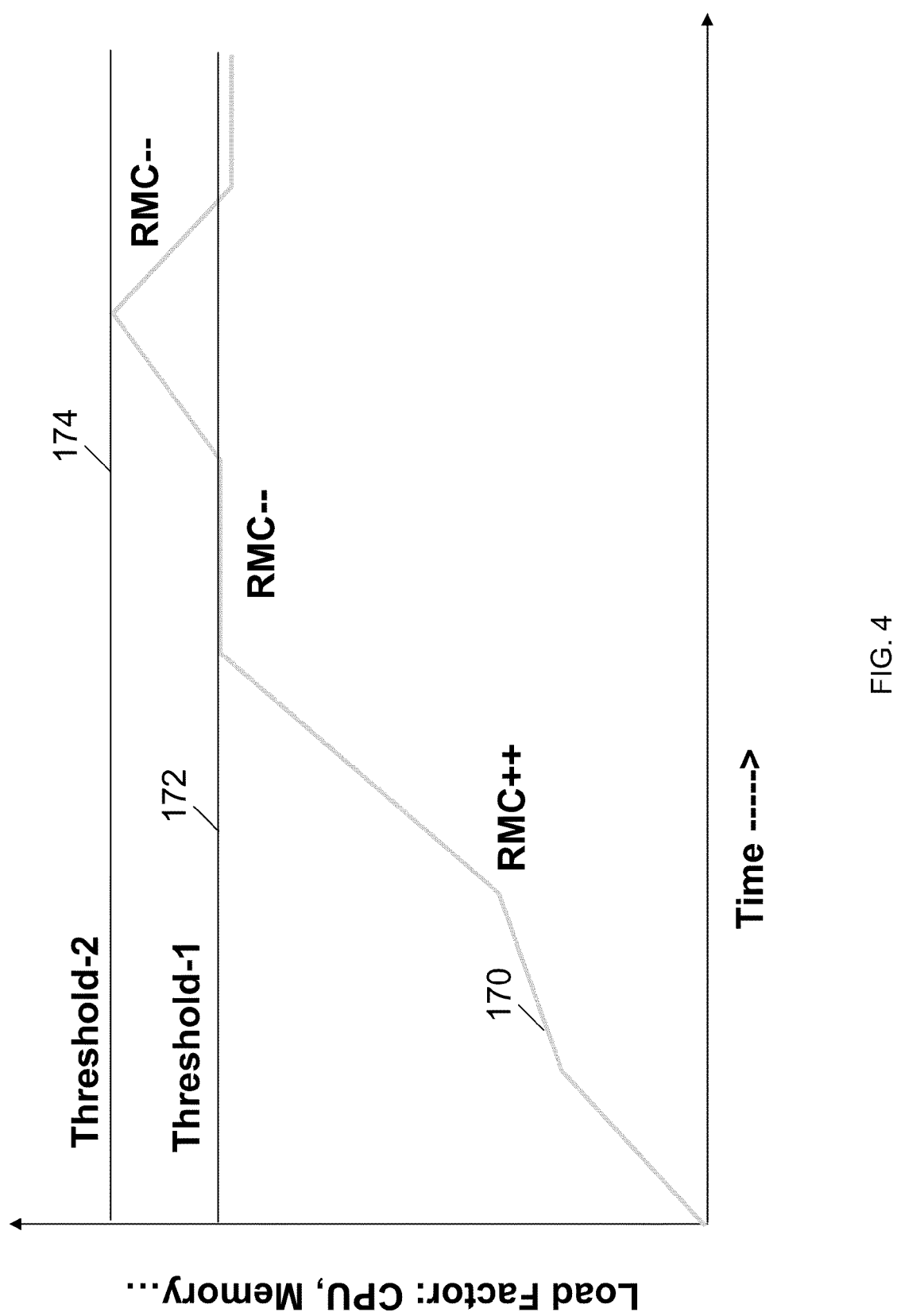
FIG. 4 illustrates a chart showing dynamic load adjustment in accordance with certain embodiments.
Figure 5:
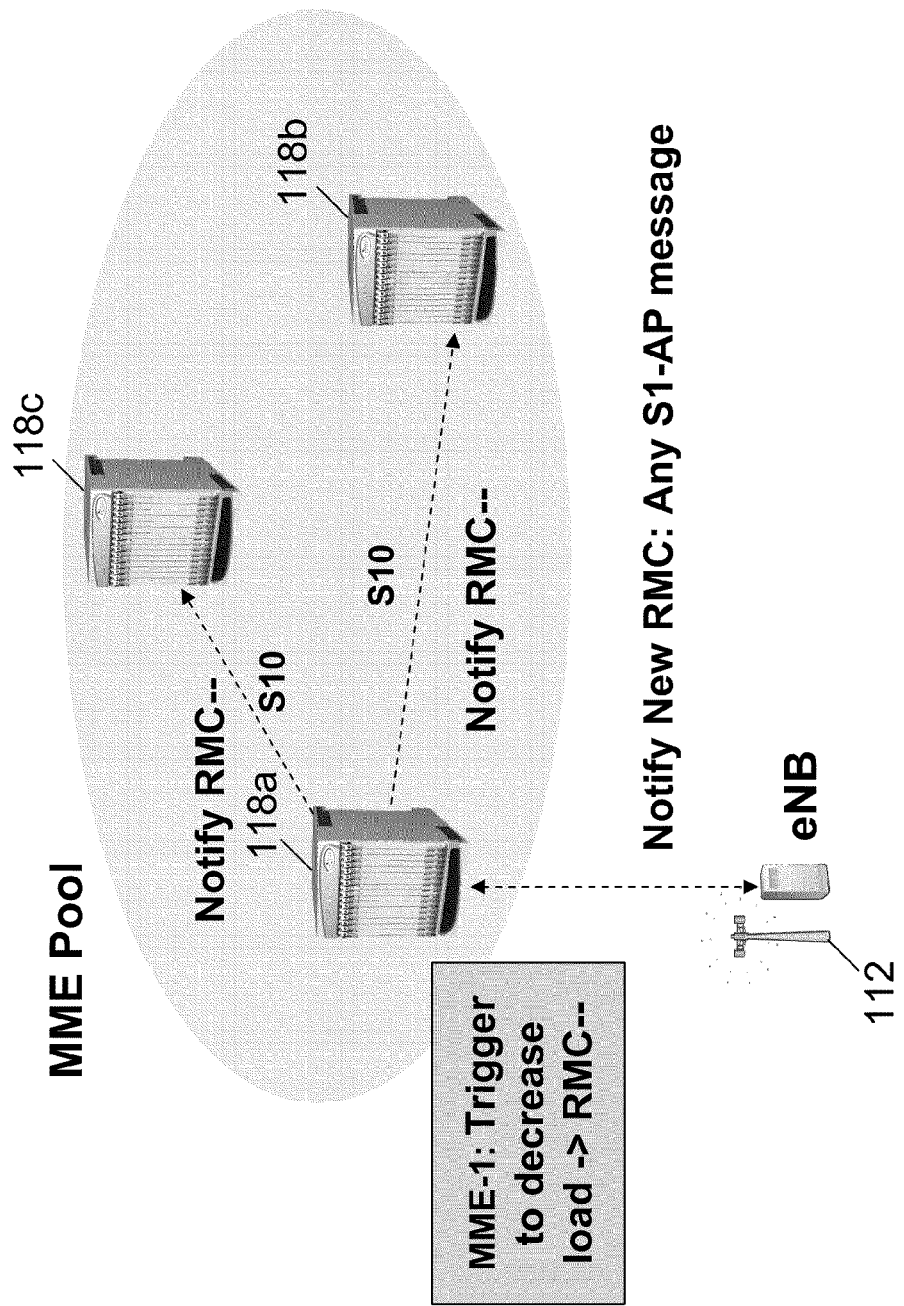
FIG. 5 illustrates a network diagram showing notification of a capacity decrement in accordance with certain embodiments.

FIG. 4 illustrates a chart showing dynamic load adjustment in accordance with certain embodiments. The y-axis of the chart is the load factor and the x-axis is a representation of time. Loading line 170 indicates loading on a network element, such as a MME. Thresholds 172 and 174 can trigger modifications to the relative MME capacity. As shown, when the loading line 170 reaches threshold 172, the relative MME capacity is decremented. The relative MME capacity is decremented again when loading line 170 reaches threshold 174. FIG. 5 illustrates a network diagram showing notification of a capacity decrement in accordance with certain embodiments. FIG. 5 includes an eNB 112 and MMEs 118a, 118b, and 118c. MME 118a, based on real time loading conditions, triggers to decrease load and decrements relative MME capacity. The change is updated to eNB 112 through a notification message. The message can be sent to all eNBs that are in communication with MME 118a because UE sessions are running on MME 118a. In some embodiments, an S1 message, which includes a relative MME capacity information element, is used to notify eNB 112. The decremented relative MME capacity can also be propagated to MMEs 118b and 118c in the MME pool. These MMEs can be notified using a S10 message, which includes a relative MME capacity information element.

Figure 6:
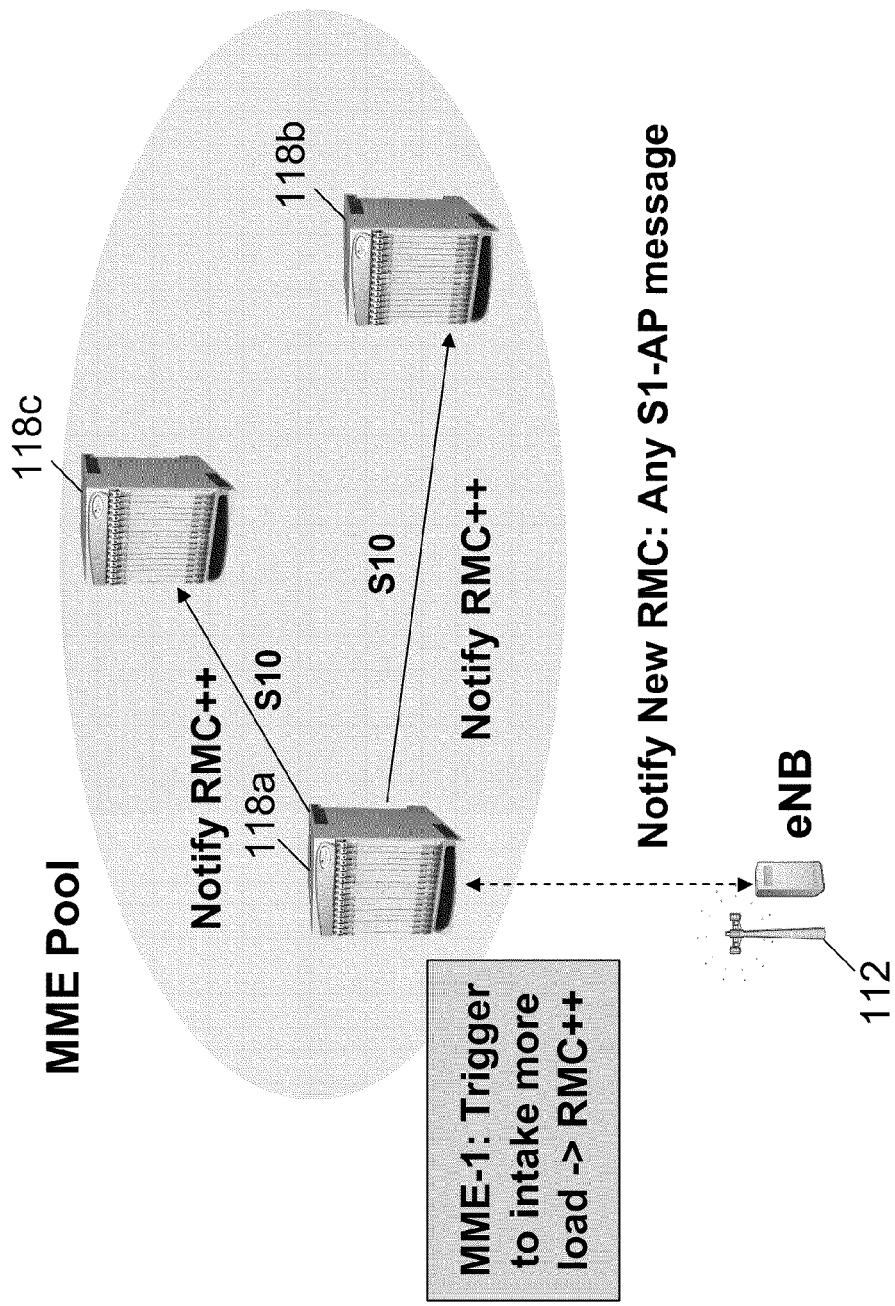
FIG. 6 illustrates a network diagram showing notification of a capacity increment in accordance with certain embodiments.

FIG. 6 illustrates a network diagram showing notification of a capacity increment in accordance with certain embodiments. FIG. 5 includes an eNB 112 and MME 118a, 118b, and 118c. MME 118a, based on real time loading conditions, triggers to intake more load and increments relative MME capacity. The change is updated to eNB 112 through a notification message. The message can be sent to all eNBs that are in communication with MME 118a because UE sessions are running on MME 118a. In some embodiments, an S1 message, which includes a relative MME capacity information element, is used to notify eNB 112. The incremented relative MME capacity can also be propagated to MMEs 118b and 118c in the MME pool. These MMEs can be notified using a S10 message, which includes a relative MME capacity information element.

Figure 7:
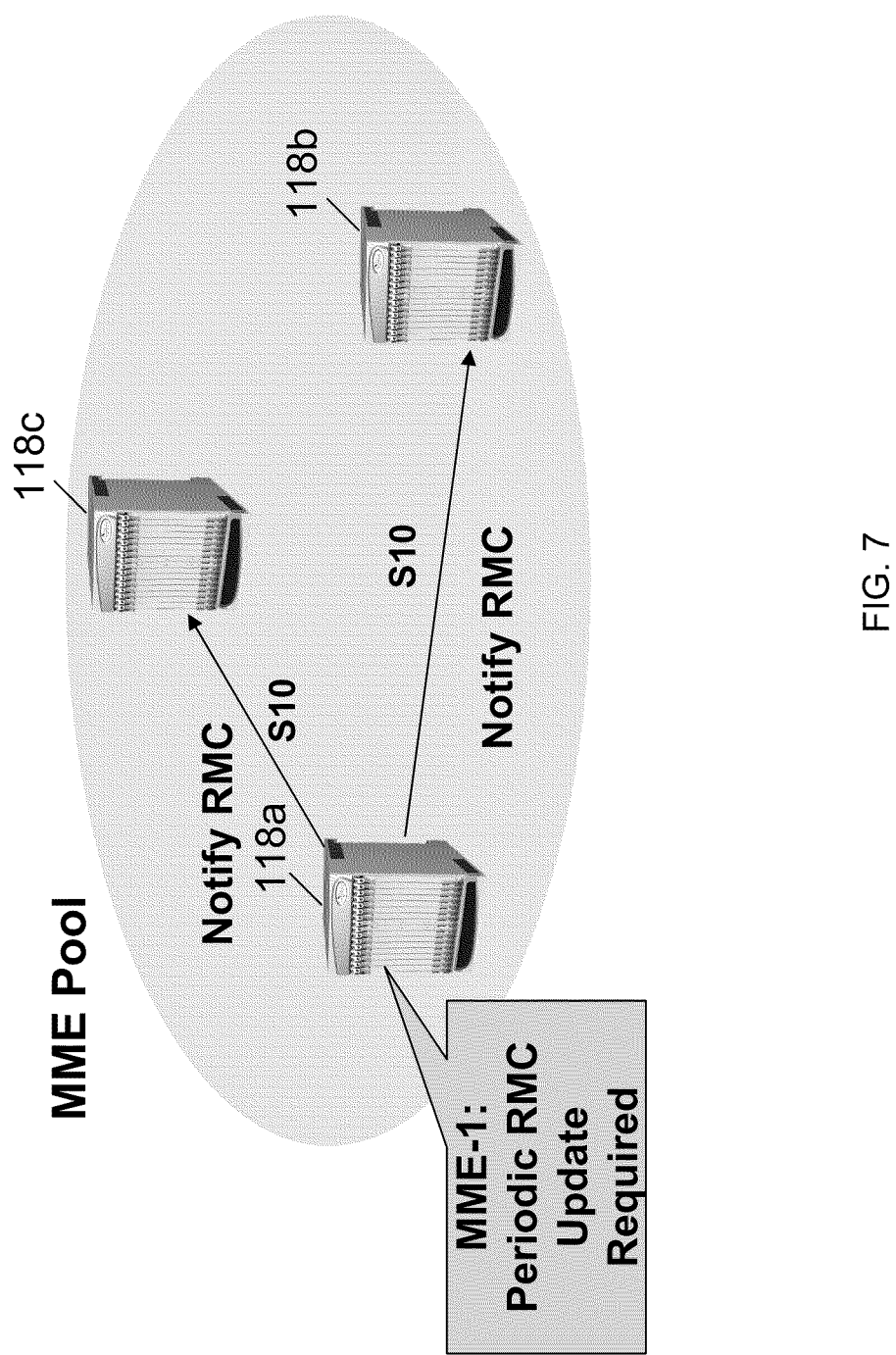
FIG. 7 illustrates a network diagram showing notification of a periodic capacity update in accordance with certain embodiments.
Figure 8:
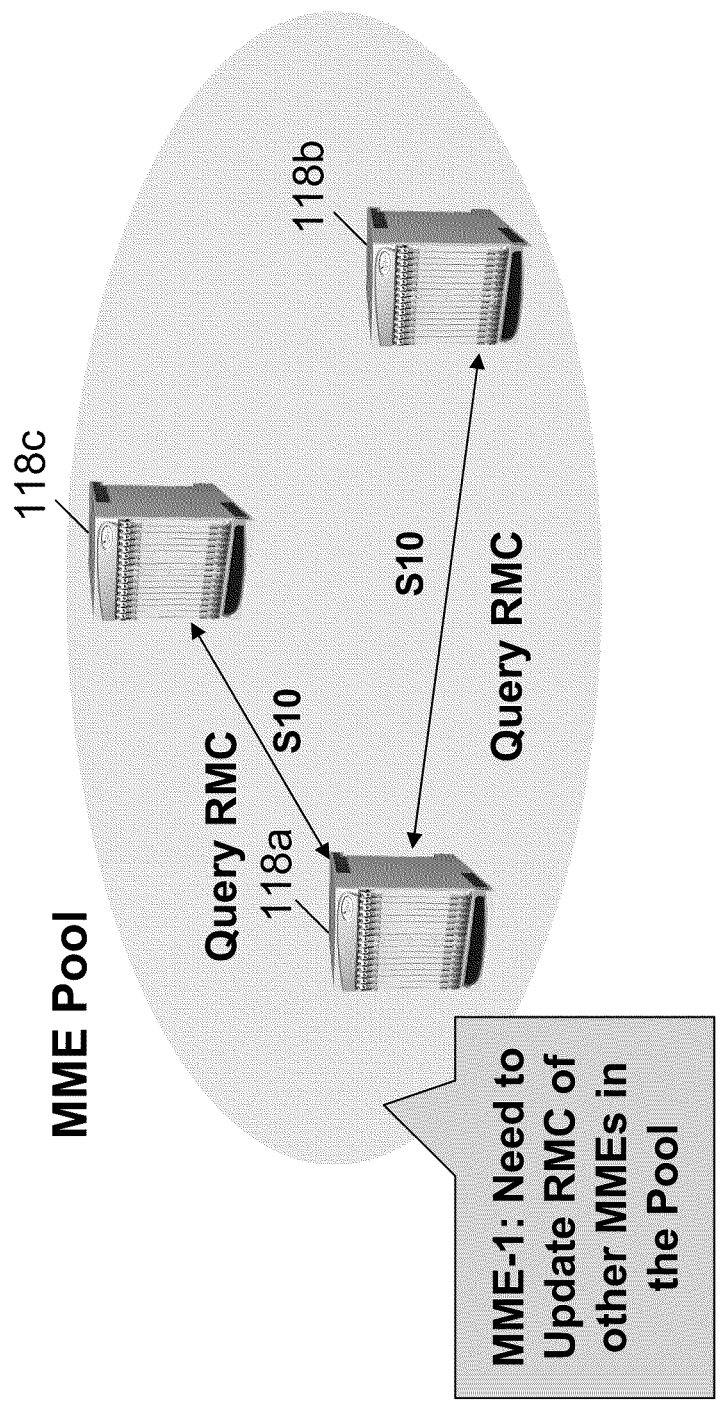
FIG. 8 illustrates a network diagram showing notification of a capacity query in accordance with certain embodiments.

The MMEs can also be set to periodically update other MMEs of each ones relative MME capacity. The periodic updating can be based on a timer in each MME. In some embodiments, the periodic updating can be used in place of trigger based updating or both can be implemented. FIG. 7 illustrates a network diagram showing notification of a periodic capacity update in accordance with certain embodiments. FIG. 7 includes a MME pool comprising MME 118a, MME 118b, and MME 118c. As shown, MME 118a can be triggered by a timer to update relative MME capacity values with peer MMEs 118b and 118c. The peer MMEs 118b and 118c can also send MME 118a their relative MME capacity values. The notification messaging can be a new S10 based messaging with a relative MME capacity information element. FIG. 8 illustrates a network diagram showing notification of a capacity query in accordance with certain embodiments. FIG. 8 includes a MME pool comprising MME 118a, MME 118b, and MME 118c. As shown, MME 118a can query other MMEs 118b and 118c to update those MMEs' relative MME capacity values. The notification messaging can be a new S10 based messaging with a relative MME capacity information element.

The new S10 based messaging can include a RMC notification request that is used to send a RMC value to other MMEs in the pool. A RMC notification response that is an acknowledgement message for a RMC notification request. A RMC info request message is used to query an RMC value from other MMEs in the MME pool, and a RMC info response is a response to an RMC info query. The above described messaging can be implemented using GPRS Tunneling Protocol for the control plane (GTP-C). Specifically, the S10 GTP-C protocol tunnels signaling messages between MMEs. In some embodiments, the private extension (see FIG. 9) of an echo request can be used to query the RMC of peer MMEs or send the RMC of a particular MME, e.g., broadcast a change in RMC, such as a decrement in value. The private extension is a vendor specific extension that allows the passing of specified values (see proprietary value FIG. 9). This can be appended to a number of different S10 messages to pass RMC information among MMEs.

The RMC value can be used in forward relocations of a UE from a first MME to a second MME, and at times the first MME chooses the second MME for the forward relocation of the UE. When a dynamic RMC value is shared among the MME pool, the MME can pick a second MME suited for accepting the forward relocation based on the RMC information of peer MMEs. Similarly, in some embodiments, a MME when contacted by an eNB can advertise the MME based on a real time RMC that is suited for accepting a new session from the eNB.

The forward relocations or redirections of eNB requests can be implemented according to an algorithm, in some embodiments. The algorithm can include processes for selection of MMEs for handovers, failovers, and relocations/redirections. As a part of this algorithm, a configurable, weighted, pool-wide, average RMC value is maintained across the MME pool (MME-pool-avg). This MME-pool-avg provides a weighted average for comparison across the MMEs pool so each individual MME can make relative determinations, and rules can be used along with the loading information to automate load balancing among MME devices. The relative determinations can include a comparison of a MME's own RMC value against the MME-pool-avg as well as the received RMC values against the MME-pool-avg. The rules can then be applied based on the comparisons between the individual RMC values and the MME-pool-avg for relocating new and existing sessions, for handover/handoff situations, and for failure conditions.

As described above, each MME can periodically exchange its RMC value with the pool. This can be accomplished by sending the information to an all-MME multicast address or by forwarding the information to peer MMEs (e.g., two-hop forwarding of received messages). The load information can be sent embedded in echo messaging, such as those used with keepalive mechanisms. For example, an echo request can be circulated by each MME to the other MMEs in the pool with the individual MME's load information embedded in the echo request. Besides the metrics named above for the RMC, the load capacity can also be expressed through the number of packet data network (PDN) connections running on the MME. For example, the RMC value can be implemented as: (# PDN connections in use/# PDN connections supported by MME)*100, where a PDN connection is a unit of resource that encompasses both the underlying hardware and software resources. The PDN connection can be considered part of a session on an MME, where the PDN connection provides communication to the packet core of the network.

In some embodiments, the algorithm determines comparisons by dividing the MME-pool-avg by the individual MME's RMC value. This can be represented as:

$$N=\text{MME-pool-avg/relative MME capacity}$$

where the MME becomes a target for relocations from other MMEs when N>1 for a particular MME, and where the MME selects another target MME when new requests arrive when N<1 for a particular MME. Alternatively, the algorithm can involve comparing the RMC values against one another and sending session relocations to the MME or MMEs that are least loaded when the source MME is above a certain threshold. For example, in either case, the algorithm can relocate sessions to the lesser loaded MMEs a certain percentage or number of times. In the alternative embodiment, this can be done by selecting the lowest set of RMC values and then using an algorithm to distribute the load among the least loaded MMEs, with the set being updated periodically to account for changing load conditions. In the MME-pool-avg embodiment, the percentage of relocations that occur can be based on the MME's loading relative to the weighted average. For example, a certain number of incoming requests are relocated when the MME is operating at twenty percent above average.

The algorithm can be implemented to distinguish between new session relocations and existing session relocations. The new sessions include newly arriving PDN connection requests, such as S1-AP session setup messages. In such an embodiment, new session requests are proportionally relocated depending on the load, and existing requests are relocated once the MME reaches a certain load cut-off value. For example, all MMEs in the pool with N>1 can be considered part of the redirect candidates set, while a particular MME with N<1 begins to proportionally select a candidate from the redirect candidate set. The selection from among the MMEs in the redirect candidate set can be performed randomly, proportionally, round-robin, or according to any other algorithm. In the proportional selection method, each candidate in the redirect set receives new sessions in proportion to its loading condition. That is, the least loaded MME takes by a factor relative to its deviation from the MME-pool-avg.

These determinations can be made using the received RMC value of peer MMEs and an MME's own RMC value. The proportionality can be enforced for selecting other MMEs at the source MME by using N (from above) to set the proportion of session relocations. For example, the source MME can select another MME candidate (1-N) number of the times, and select itself N number of the times (where N is a decimal number). Note: the value N can also be thought of as a percentage by multiplying N by 100. For example, if N=0.9 (or 90 percent), the MME accepts the new session 90 percent of the time, and redirects the session 10 percent of the time. With an N=0.9, the MME's own load is closer to that of MME-pool-avg, while with an N=0.2, the MME's own load is significantly higher than the MME-pool-avg. As such, with N=0.2, the MME redirects new session requests 80 percent of the time to lesser loaded MMEs.

Existing sessions on the MME can also be relocated depending on the embodiment. For example, the MME can be configured to move the existing sessions to other less loaded MMEs at a predefined value. The predefined value can be configured according the operator's preferences to guard against any overload failures such as a set N value or RMC value. In addition, existing session removal can be triggered by other events such as a manual shut down or a failure condition. In these situations, the MME can also move existing sessions to target MMEs in the redirect candidate set to maintain load balance among the MMEs. In some embodiments, the selection of MMEs in the redirect candidate set can be done randomly, proportionally, round-robin, or according to some other algorithm.

In some embodiments, MMEs can choose the target MME for a UE handover/handoff situation. In such an instance, one or a combination of RMC value, N value, and MME-pool-avg can be used to determine the target MME selected by the source MME. In operation, the source MME can use information received from other MMEs, e.g., in an S10 message, to determine which MME to select. The source MME, upon selecting the target MME, can send the target MME's information to the eNodeB, which can use the information to select the target MME. In the handover situation, the source MME can send the target MME information to the target eNodeB (i.e., the eNodeB to which the UE is moving). The target eNodeB uses this target MME information to request a session or connection with the target MME.

Figure 10:
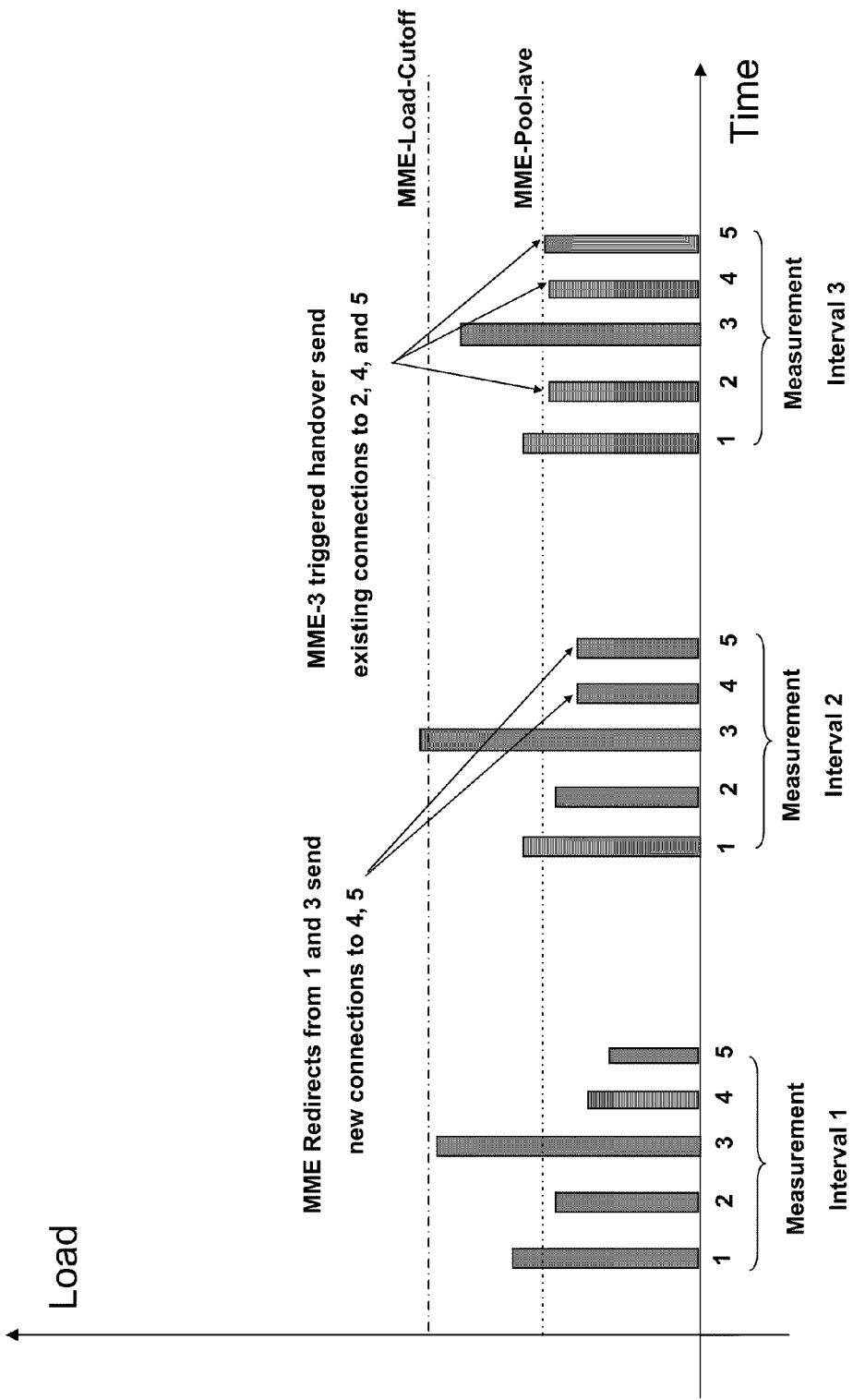
FIG. 10 illustrates a graph showing how load balancing can work in operation in accordance with certain embodiments.

FIG. 10 illustrates a graph that shows the load balancing algorithm in operation in accordance with certain embodiments. The graph of FIG. 10 illustrates three successive intervals of time, where load measurements are made. As shown, the y-axis is the "N" value (from above), and the x-axis is time (with each interval occurring later in time). In interval 1, MME-1 and MME-3 are the most loaded, while MME-4 and MME-5 are the least loaded. Since MME-3's scaled load value (which is based on the RMC value), is high relative to the MME-pool-avg, MME-3 is proportionally sending the majority of its new sessions to other MMEs in the pool. MME-1, which is closer to the MME-pool-avg is still accepting many of the new sessions it receives. In interval 2, MME-3 has continued to become more loaded and surpassed the MME-load-cut off line. This triggers the relocation of the sessions from MME-3 to MME-2, MME-4, and MME-5, the latter three each having less than average loading. In interval 3, MME-3's load has been significantly reduced compared with intervals 1 and 2, while MME-2, MME-3, and MME-5 have been brought almost to the MME-pool-avg. The MME-pool-avg can also be periodically calculated either when the RMC value is determined or separately. As shown in FIG. 10, the algorithm uses the RMC value in conjunction with an algorithm to provide load balancing among a pool of MMEs. The algorithm is used to keep the MMEs balanced and resorts to more drastic measures as individual MMEs become further unbalanced.

The mobile device or user equipment described above can communicate with a plurality of radio access networks (including eNodeBs) using a plurality of access technologies. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment can also keep global positioning coordinates or other location information in its stack or memory. In addition, the user equipment can store relative MME capacity values received from MMEs in the network and use a processor to determine which MME to select. In some embodiments, this can be done by the eNodeB on behalf of the user equipment.

The user equipment can include one or more antennas that are configured to transmit and receive data on a radio frequency with a plurality of radio access networks and/or access technologies. The one or more antennas can be used to send and receive data flows over a plurality of access technologies. The mobile device can be configured with one or more processors that process instructions to modulate data on a first access technology and a second access technology and to process a first data flow and a second data flow received from the at least one antenna. The processors can also communicate with a computer readable medium used for storage such as programmable read only memory. The processor can be any applicable processor such as a system-on-a-chip that combines a CPU, an application processor, and flash memory. The processor can also compile user preferences regarding how certain types of data flows are transmitted to the mobile device and communicate these preferences to the network, such as the access gateway.

The gateway described above is implemented in a chassis in some embodiments. This chassis can implement multiple and different integrated functionalities. In some embodiments, a mobility management entity (MME), a PDN gateway (P-GW), a serving gateway (SGW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 11:
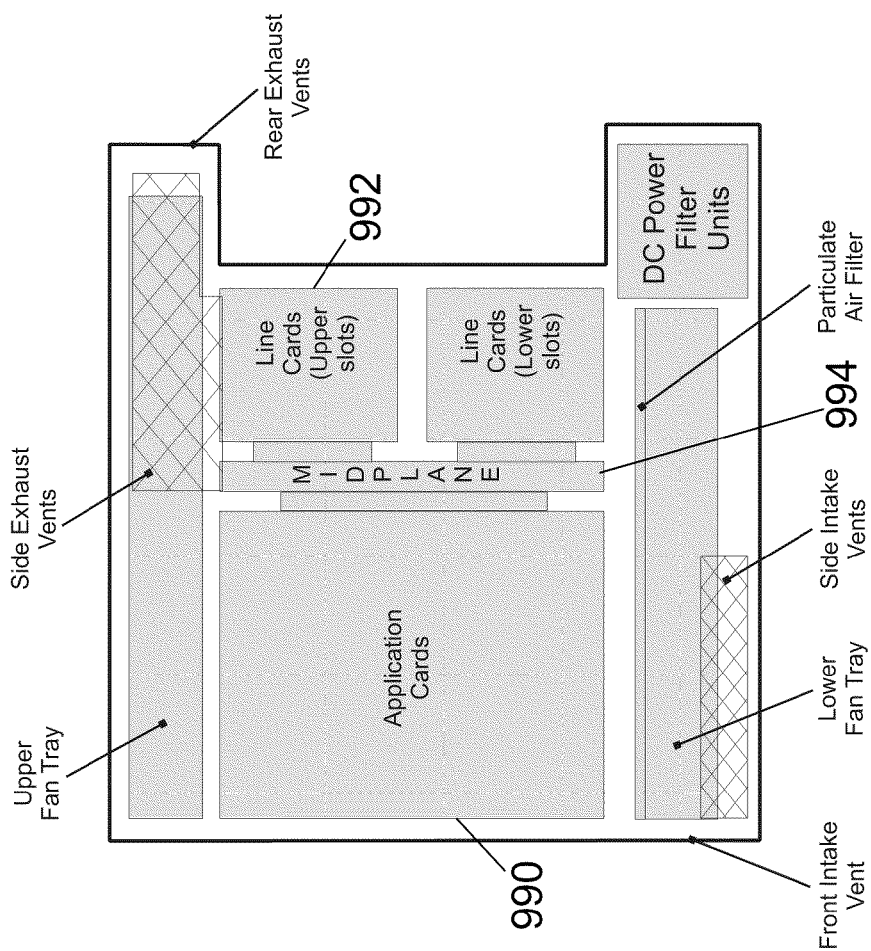
FIG. 11 illustrates a chassis in accordance with certain embodiments.

The features of a chassis that implements a gateway, in accordance with some embodiments, are further described below. FIG. 11 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, MME, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A management gateway comprising:
a processing unit configured to:
implement a management function for providing tracking, activation and deactivation of bearers, and mobility management for mobile devices,
monitor load conditions on the management gateway in real time,
periodically determine a load capacity value based on the load conditions, the load conditions including information regarding at least one of processing unit usage, memory usage, and number of sessions active, and
select one or more eNodeBs and one or more core network nodes in communication with the one or more eNodeBs to which the load capacity value is to be sent for use in assigning a mobile device to a mobility management entity (MME);
a memory in operative communication with the processing unit where the load capacity value is stored and updated whenever a change occurs in the load capacity value; and
a network interface configured to communicate with the one or more eNodeBs and the one or more core network nodes to allow the management gateway to send a message that reflects the load capacity value to the selected one or more eNodeBs and the selected one or more core network nodes.

2. The management gateway of claim 1, wherein the message sent to the selected one or more eNodeBs from the gateway includes at least one of a S1 setup message and a MME configuration update message, and the load capacity value is sent as a relative MME capacity.

3. The management gateway of claim 1, wherein the one or more core network nodes include at least one of a network management system element and a second gateway implementing mobility management entity (MME) functions.

4. The management gateway of claim 3, wherein the message sent to the second gateway includes an S10 based message.

5. The management gateway of claim 3, wherein the memory is configured to store a load capacity value received from the second gateway.

6. The management gateway of claim 5, wherein the processor determines a weighted MME pool average using a plurality of load capacity values including the load capacity value of the MME function and at least the load capacity value received from the second gateway.

7. The management gateway of claim 6, wherein the processor compares the load capacity value of the MME function against the weighted MME pool average and the load capacity value received from the second gateway against the weighted MME pool average.

8. The management gateway of claim 7, wherein the processor determines to relocate a new session by sending to an eNodeB information for a less loaded gateway running an MME function.

9. The management gateway of claim 1, wherein the processing unit in determining the load capacity value uses an algorithm to determine an integer value to represent the load capacity value and this integer is changed when a threshold relating to one or more of processing unit usage, memory usage, and number of sessions active is exceeded.

10. A method of dynamically representing loading conditions comprising:
    monitoring load conditions in real time on a mobility management entity (MME) implemented on a gateway;
    determining a load capacity value to represent the load conditions of the MME and updating the load capacity value when load conditions when load conditions change for the MME;
    storing the load capacity value in a memory on the gateway;
    selecting an eNodeB and a core network node in communication with the eNodeB to which the load capacity value is to be sent for use in assigning a mobile device to a MME;
    sending the load capacity value for the MME to the eNodeB; and
    sending the load capacity value for the MME to the core network node.

11. The method of claim 10, wherein the sending to the eNodeB includes at least one of a S1 setup message and a MME configuration update message, and the load capacity value is sent as a relative MME capacity.

12. The method of claim 10, wherein the core network node includes at least one of a network management system element and at least one MME.

13. The method of claim 12, wherein the sending to the at least one MME includes an S10 based message with a load capacity value information element.

14. The method of claim 12, further comprising storing on the gateway a load capacity value received from the at least one MME.

15. The method of claim 14, further comprising:
    determining a weighted MME pool average using a plurality of load capacity values including a load capacity of the MME and a received load capacity value from each of the at least one MMEs;
    comparing the load capacity value of the MME against the weighted MME pool average; and
    comparing the received load capacity value against the weighted MME pool average.

16. The method of claim 15, further comprising:
    relocating a new session request received from an eNodeB to a lesser loaded MME; and
    relocating an existing session based on the load capacity value of the MME rising above a predefined level.

17. The method of claim 10, wherein the determining of the load capacity value uses an algorithm to determine an integer value to represent the load capacity value and this integer is changed when a threshold is passed according to the algorithm.

18. The method of claim 10, further comprising selecting a MME for a handoff of user equipment based on load capacity values received from a plurality of MMEs.

19. A management gateway implementing a mobility management entity (MME) function configured to monitor load conditions on the management gateway in real time and to periodically determine a load capacity value based on the load conditions, to store and update the load capacity value whenever a change occurs to the load capacity value, to select one or more eNodeBs and one or more core network nodes in communication with the one or more eNodeBs to which the load capacity value is to be sent for use in assigning a mobile device to an MME, and to send a message that includes a load capacity value informational element to the one or more eNodeBs and the one or more core network nodes.

* * * * *